Oct. 16, 1956        R. F. ADAMS        2,766,514
PROCESS FOR MAKING HOLLOW METAL ARTICLES HAVING PASSAGEWAYS
Filed Aug. 24, 1952        2 Sheets-Sheet 1
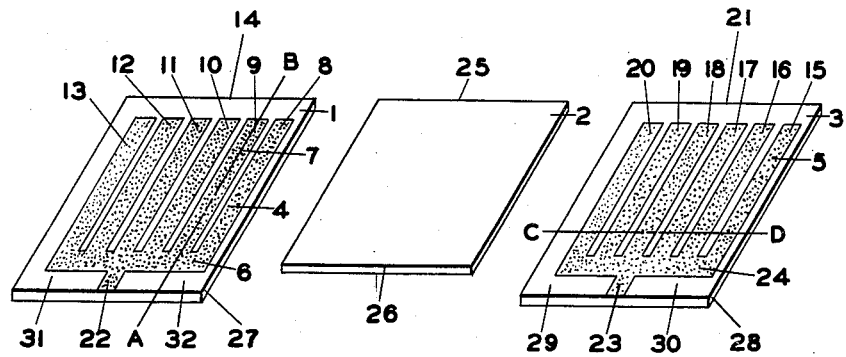
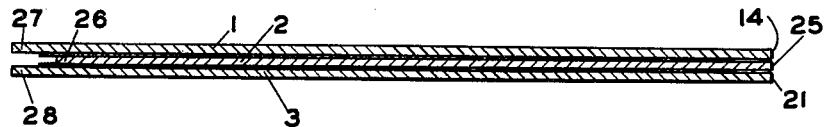
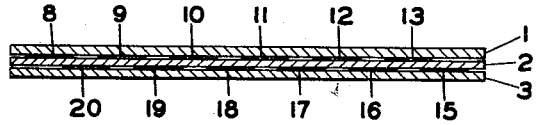
*INVENTOR:*
RICHARD F. ADAMS
BY *Clelle W. Upchurch*
*AGENT.*

Oct. 16, 1956 R. F. ADAMS 2,766,514
PROCESS FOR MAKING HOLLOW METAL ARTICLES HAVING PASSAGEWAYS
Filed Aug. 24, 1952 2 Sheets-Sheet 2

*INVENTOR:*
RICHARD F. ADAMS

BY *Clello W. Upchurch*

*AGENT.*

United States Patent Office 2,766,514
Patented Oct. 16, 1956

2,766,514

PROCESS FOR MAKING HOLLOW METAL ARTICLES HAVING PASSAGEWAYS

Richard F. Adams, Alton, Ill., assignor to Olin Mathieson Chemical Corporation, a corporation of Virginia Application August 24, 1953, Serial No. 376,133

1 Claim. (Cl. 29—157.3)

This invention relates generally to a metallurgical process and more particularly to a novel and improved method for forming structural members and other cavitated articles from a plurality of sheets of metal.

In a process which involves welding preselected areas of the surfaces of a plurality of strips of metal and thereafter inflating those areas between the welds by the application of fluid pressure, considerable difficulty has been experienced in properly expanding such free spaces because each of the plurality thereof will not begin expanding simultaneously and will not continue to expand uniformly. Consequently, one free space or area might expand into another free space before this second free space has expanded and will thus prevent it from properly expanding. Such a condition can usually be prevented in a structure fabricated from only three sheets wherein the free spaces to be expanded are separated by only one intermediate metal sheet by using two synchronized inflating instruments, one on each side of the intermediate sheet. Synchronization of the fluid pressure is very difficult, however, and not always entirely accomplished. When cavities are to be formed in welded assemblies of more than three sheets the use of a plurality of inflating devices is even more difficult and less satisfactory.

It is therefore an object of this invention to provide an improved method for forming cavitated articles from metal strips. Another object of the invention is to provide a novel assembly of metal sheets having areas therein adapted for inflation by fluid pressure. A further object of the invention is to provide an improved process for forming partially hollow structural members and similar articles by welding contiguous surfaces of a plurality of metal sheets in preselected areas and thereafter inflating the areas between the thus formed welds by fluid pressure. A more specific object of the invention is to provide an improved method for inflating the areas between a plurality of sheets of metal having weld lines bordering said areas.

Further objects will become apparent from the following description with reference to the attached drawing in which Figure 1 illustrates metal sheets prior to assembly thereof to form one embodiment of the invention, while Figure 2 is a longitudinal sectional view through the assembly of the sheets of Figure 1 at the position of line A—B;

Figure 3 is a cross-sectional view of the assembly of the sheets of Figure 1 at the position C—D;

Figure 4:
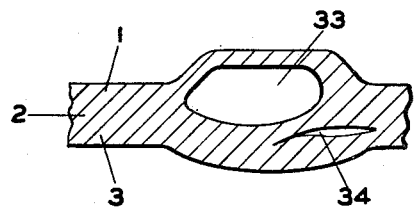
Figures 4 and 4a are cross-sectional views of piles of metal sheets at the line C—D of Figure 1 after welding and partial inflation of the areas between welds and Figure 5 is a cross-sectional view at the line C—D of Figure 1 after complete inflation of areas between welds.

In accordance with this invention the foregoing objects and advantages are accomplished, generally speaking, by welding adjacent surfaces in a pile of metal sheets but leaving portions of such surfaces unwelded in such fashion as to provide a partial overlapping of the unwelded portions of adjacent pairs of sheet surfaces. Thus, considering a sheet intermediate between the top and bottom sheets, the unwelded portions on one side of said sheet would in part overlap or be staggered in relation to the unwelded portions on the opposite side of said sheet, but none of such unwelded portions are completely overlapped by unwelded portions immediately above or immediately below it in the pile. The free spaces or unwelded areas between welds communicate with the external surface of the assembly through a free space forming a common passage or header in order that a substantially uniform fluid pressure can be applied to each area at substantially the same time to effect expansion thereof.

Although the method of this invention is advantageous for the inflation of free spaces or unwelded areas of an assembly which has been welded by any suitable method including conventional torch welding methods, it is preferred to weld the preselected regions of the face to face surfaces of juxtaposed metal sheets by pressure rolling methods such as by a hot roll bonding method similar to that disclosed by Grennell in the copending patent application Serial No. 218,116, now abandoned, also the property of the assignee of this invention.

In accordance with such process, a suitably foreshortened pattern of weld preventing material is interposed between adjacent surfaces of a pile of metal sheets and this assembly is thereafter rolled at a suitable temperature and pressure to effect adequate reduction of the thickness of the metal sheets to weld the unprotected areas thereof. In a preferred embodiment of the instant invention, prior to bonding the sheets in accordance with the Grennell process, the pattern of weld preventing material or "stop-off" material is interposed between one pair of adjacent surfaces of juxtaposed metal sheets of an assembly of a plurality of at least three sheets in a position that only partially overlaps the stop-off material which is interposed between another surface of one of the pair of sheets with a third metal sheet.

Many articles such as structural metal supports and similar members are composed of hollow channels or cavities which do not communicate with each other but, on the other hand, extend for a considerable length or extend throughout the length of the member. In forming such articles by a preferred embodiment of this invention from say three sheets of metal, each part of the patterns of stop-off material lying adjacent each side of the interposed sheet continues into stop-off material lying between the two outer sheets of the assembly at least partially beyond the edge of the shorter interposed sheet. This area of the pattern lying beyond the edge of the interposed metal sheet preferably continues at a predetermined position to the edge of the assembly. After pressure welding those regions of the sheets bounding the pattern, the metal sheets are pried apart at the locale of the pattern at the edge of the assembly. A suitable instrumentality is inserted between the sheets by means of the thus formed opening and fluid pressure is introduced therethrough to expand the free spaces lying between the welds.

The free space lying between welded areas of the two outer sheets and beyond the edge of the layer formed by the interposed sheet will expand first and form a chamber or header which communicates with each of the other passages or spaces to be inflated. The free spaces lying on both sides of the interposed sheet will not commence expanding simultaneously. After one group begins expanding, further expansion of that group is apparently less difficult than starting the expansion of the other group because those free spaces have thus started to bulge under the pressure will usually continue expanding until the wall of the confining die is reached before the free spaces of the other group will begin expanding.

The expansion of these free spaces will not only be in the direction towards the sheet of metal adjacent thereto but will be also towards the sheet adjacent the other side of the interposed sheet. As a result, as the expansion continues in this direction, that portion of the interposed sheet bounding the free space which is directly opposite the expanding space will be pressed more firmly against the adjacent sheet and subsequent expansion of the free space will become increasingly more difficult, if not impossible. But, since in accordance with this invention, the pattern between one side of the interposed sheet and the sheet adjacent thereto does not entirely overlap the similar pattern between the other side of the interposed sheet this condition is avoided because that portion of the interposed sheet bounding the free space and not overlapping a similar area on the opposite side of the sheet will not be pressed more firmly against the adjacent sheet. Once expansion of a free space is started, it can easily be continued until even that portion of the space which was pressed against the adjacent sheet can be expanded to conform with the configuration of the dies.

In order to further clarify and to better explain the invention, the following is a description of an embodiment thereof with reference to the drawing:

A pattern of a suitable stop-off material such as, for example, one composed of about 40 percent calcium carbonate having a granulation of less than about 325 mesh, about 13 percent colloidal graphite, about one percent wetting agent, and about 46 percent water is applied to a suitable clean surface of aluminum sheets 1 and 3 of Figure 1 by stenciling with a silk screen. Rectangular areas 8, 9, 10, 11, 12, and 13 on sheet 1 each terminate internally of edge 14 but extend into the area 6 and to the edge of the sheet through passage 22. Rectangular areas 15, 16, 17, 18, 19 and 20 terminate internally of edge 21 of sheet 3 but extend into area 24 and to the edge of the sheet through passage 23.

Sheets 1, 2 and 3, each about 0.08 inch thick, are assembled so that edges 14, 21 and 25 are substantially even with each other. Sheet 2 is shorter than sheets 1 and 3 and terminates within the area covered by 6 of sheet 1 and within 24 of sheet 3, the resulting assembly being similar to that shown in the cross-sectional view of Figure 2. This view is of a section through the assembly at the line A—B. The rectangular areas 8, 9, 10, 11, 12 and 13 and areas 15, 16, 17, 18, 19 and 20 are located on sheets 1 and 3 respectively so that they do not entirely overlap each other. In other words, care is exercised to insure that the pattern on sheet 2 is moved to the right of sheet 3, as shown in the drawing, a distance sufficient to form a partially overlapping pattern such as shown in Figure 3. Figure 3 is a sectional view through the assembly at line C—D and shows the relative position of the two patterns on opposite sides of sheet 2.

The resulting pile or assembly of sheets 1, 2 and 3 are spot welded in a few places or otherwise bound together to prevent slippage relative to each other. The assembly is then heated in a suitable furnace to a temperature of about 890° F. and is immediately rolled in one pass to reduce the thickness of the assembly from about 0.24 inch to about 0.08 inch. After cooling, the pile is rolled to further reduce it to the desired gauge of about 0.06 inch after which the assembly is annealed by heating in a suitable furnace at a temperature of about 650° F. for about one-half hour.

During the hot rolling of the assembly, regions 27 and 28 of sheets 1 and 3, respectively, extending beyond edge 26 of sheet 2 are forced together and the surfaces 29 and 30 of sheet 3 are welded to surfaces 31 and 32 of sheet 1 to bound unwelded areas 24 and 6 except in the regions 22 and 23. In some instances where the amount of reduction will not be sufficiently great to force the surfaces of regions 27 and 28 together and weld them, strips of metal of suitable thickness can be inserted between sheets 1 and 3 to cover only those surfaces 22, 23, 29, 30, 31 and 32 of the sheets. In this way, each of sheets 1 and 2 will be welded to the interposed strip of metal.

Figure 4A:
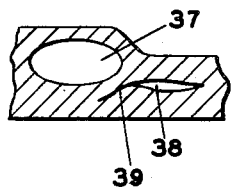

After welding has been completed, the passage between 22 and 23 is pried open sufficiently to permit insertion of a suitable needle or other suitable instrumentality for conducting a fluid such as compressed air into the areas lying between the welds. The free spaces 6 and 24 will begin expanding as pressure is applied and will form a header through which additional fluid will pass to the rectangular passages or free spaces 8, 9, 10, 11, 12 and 13 between sheets 1 and 2 and passages or free spaces 15, 16, 17, 18, 19 and 20 between sheets 2 and 3. Expansion of one or more of the free spaces on one side of the interposed sheet 3 will ordinarily begin before free spaces on the other side of the sheet begin expanding. The expansion of one of these thus started free spaces will continue without expansion of an opposed space until a cavity is formed in the assembly as illustrated in Figure 4. For example, the areas might expand to the extent illustrated at 33 of Figure 4. In this particular instance the free space 33 has been distorted to the point that inflation of space 34 will require moving the metal of former sheet 2 adjacent space 34 back towards the metal formerly sheet 1. If the entire free space on one side of the sheet is directly opposite a free space on the other side, that is, if space 34 were directly below space 33, inflation would be extremely difficult, if not impossible. Where the patterns are designed to not completely overlap each other, that portion of the free space such as at 38 which extends beyond 37 of Figure 4a will inflate without much difficulty and once such expansion has occurred it will continue into the distorted and sealed region 39 also without much difficulty or without requiring the application of excessive pressures.

Figure 5:
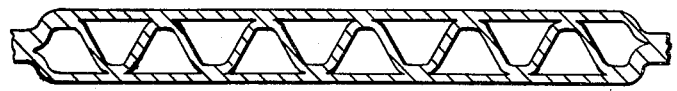

Figure 5 is illustrative of the type of product obtainable by the foregoing embodiment of the process of the invention after the welded and inflated assembly has been trimmed to remove the headers 24 and 6 and to remove the welded areas along edges 14, 25 and 21 to expose open ends of the cavities which have been formed from free spaces 8, 9, 10, 11, 12 and 13 and 15, 16, 17, 18, 19 and 20.

Hollow articles can be made from copper, copper alloys, titanium, zirconium, steel or similar metals as well as aluminum in accordance with this invention and any "stop-off" material capable of preventing welding of juxtaposed surfaces can be utilized to form the pattern in lieu of the composition described in the foregoing embodiment. At least about 10 percent of the pattern should not overlap a pattern between face to face surfaces of juxtaposed metal sheets in order to insure optimum expansion with a minimum of difficulty.

The amount of reduction required to effect welding of juxtaposed surfaces will vary with the particular metal and the physical properties thereof. A reduction in thickness of at least 50 per cent is sufficient for welding most metal sheets but a greater percentage reduction may be required for welding some metals.

Sheets of one metal can be welded to sheets of another metal in accordance with this invention to make hollow articles particularly well suited for specialized purposes. However, the various kinds of metal chosen to form such a composite structure must have physical properties which will permit heating the assembly to a temperature above the recrystallization point of all metals utilized without melting any one of the sheets. By heating the metal above the recrystallization temperature thereof and reducing the metal in accordance with the preferred methods of this invention a substantially complete erasure of the interface between sheets of metal by interdispersion of the grains of one sheet with those of the adjacent sheet is obtained. The resulting juncture is usually characterized by a tensile strength equal that of other regions of the metal sheet.

The sheet of metal interposed between a pair of sheets can terminate anywhere within the free spaces 6 and 24 but must not extend into areas 31, 32, and 29 and 30. If the interposed sheet does terminate beyond the specified region, the free spaces on one side of the exposed sheet will often expand first and will force the interposed sheet so tightly against the member of the assembly between which expansion has not begun that expansion will be almost impossible. In other words, if the free spaces of the illustrated assembly between sheets 1 and 2 expand first, the edge of interposed sheet 2 will often be forced against surfaces 29 and 30 of sheet 3 so tenaciously that expansion of the free spaces between sheets 2 and 3 will be very difficult or almost impossible. If the interposed sheet terminates short of the juxtaposed pair of sheets and within the area communicating with all other passages of the assembly distortion of part of the assembly by expansion of the other is avoided and expansion of all unwelded areas or free spaces can be accomplished by applying fluid pressure through the header thus provided.

For convenience much of the foregoing description is with reference to a pile of three sheets in which one sheet is interposed between two sheets of greater dimension. The invention is not limited, however, to a pile consisting of three sheets but is equally applicable to multiples thereof or to piles containing various numbers of sheets. As indicated hereinbefore, where the number of interposed shorter sheets or the thickness thereof are such that the distance between the overlapping ends of the pair of sheets is too great for the surfaces thereof to be forced together and to be welded in those areas bounding the pattern to form free spaces from which the header can be formed, suitable strips of metal are inserted to cover those areas bounding the pattern and face to face surfaces of the strips and sheets are thereafter welded together. Thus, in this way, several shorter sheets may be interposed between two longer sheets.

While embodiments of the invention have been described in detail, this description is only illustrative and many changes may be made therein by those skilled in the art without departing from the spirit and scope of the invention as set forth in the appended claim.

The word "sheet" is used in the appended claim to define a piece of metal which is very thin in relation to its length and breadth and "free space" denotes an unwelded area of metal lying between welded areas of adjacent surfaces of two sheets.

Having thus described the invention, what is claimed and desired to secure by Letters Patent is:

A method for making hollow articles having passageways lying one above the other comprising, forming a stack of at least three sheets of metal with the two outer sheets longer than the intermediate sheets, and simultaneously sandwiching between one side of an intermediate sheet and the adjacent sheet a series of bands of stop-off material and a similar series of bands of stop-off material between the other side of the intermediate sheet and the adjacent sheet with each of the bands of one series staggered with respect to each of the bands of the other series and overlapping not more than 90 percent thereof, said bands terminating internally of the edges of the stack at one end and all leading into a common transverse band at the other end that lies between the two outer sheets and beyond the end of the intermediate sheet but terminates internally of the edges of the outer sheets; securing the sheets against relative movement, forge welding by rolling the areas of the intermediate sheet and adjacent sheets bordering said bands and the areas along the edges of the longer sheets bordering the transverse band, and thereafter directing fluid pressure into the common transverse band to expand the unwelded areas adjacent said stop-off material, whereby the outer sheets are moved apart and the intermediate sheet is deformed.

References Cited in the file of this patent
UNITED STATES PATENTS

| | | |
|---|---|---|
| 1,723,659 | Rosenqvist | Aug. 6, 1929 |
| 1,847,176 | Frame | Mar. 1, 1932 |
| 1,994,903 | Warrender | Mar. 19, 1935 |
| 2,212,481 | Sendzimir | Aug. 20, 1940 |
| 2,462,136 | Smith | Feb. 22, 1949 |
| 2,577,123 | Hitchens | Dec. 4, 1951 |
| 2,582,358 | Schoellerman | Jan. 15, 1952 |
| 2,587,116 | Clay | Feb. 26, 1952 |
| 2,653,117 | Keene | Sept. 22, 1953 |
| 2,662,273 | Long | Dec. 15, 1953 |
| 2,740,188 | Simmons | Apr. 3, 1956 |